United States Patent [19]
Grelich

[11] Patent Number: 5,458,417
[45] Date of Patent: Oct. 17, 1995

[54] UNIVERSAL KITCHEN APPLIANCE

[76] Inventor: Thomas Grelich, 1, Prof. Wilhelm Kempff Weg, DE-95349 Thurnau, Germany

[21] Appl. No.: 146,038

[22] Filed: Apr. 24, 1992

[86] PCT No.: PCT/DE92/00339
§ 371 Date: Dec. 27, 1993
§ 102(e) Date: Dec. 27, 1993

[87] PCT Pub. No.: WO92/19139
PCT Pub. Date: Nov. 12, 1992

[30] Foreign Application Priority Data

Apr. 27, 1991 [DE] Germany .......................... 41 13 862.7

[51] Int. Cl.⁶ ............................. B01F 7/02; B02C 13/00
[52] U.S. Cl. ...................... 366/289; 241/69; 241/283; 366/333; 425/197; 425/209
[58] Field of Search ..................... 366/285, 289, 366/286, 333; 100/125, 134; 425/127, 209; 241/69, 283

[56] References Cited

U.S. PATENT DOCUMENTS 2,483,472  10/1949  Matarrese .
3,186,020  6/1965   Redfield .
4,146,333  3/1979   Zani .
5,150,967  9/1992   Neilson ................................. 366/289

FOREIGN PATENT DOCUMENTS 327650   6/1903   France .
1312077  11/1962  France .
1584144  12/1969  France .
194362   2/1906   Germany .
655896   6/1982   Switzerland .

*Primary Examiner*—Robert W. Jenkins
*Attorney, Agent, or Firm*—Robert W. Becker & Associates

[57] ABSTRACT

A kitchen appliance for processing food by chopping, mixing, whipping, kneading, pressing, and preparing emulsions from food has a horizontally positioned cylindrical vessel for receiving food. A tool for processing food in the vessel has a diameter that matches the inner diameter of the vessel. A drive motor is connected with a drive shaft to the tool for driving the tool in rotation. An advancing unit is provided for advancing the tool in the axial direction of the vessel over its axial length. The advancing unit has a stationary spindle and a slide connected to the spindle so as to be slidable on the spindle in the axial direction of the vessel, wherein the slide is displaced by an electric motor on the spindle in the axial direction. The drive motor of the tool is connected to the slide to allow for axially advancing the tool within the vessel.

23 Claims, 3 Drawing Sheets

UNIVERSAL KITCHEN APPLIANCE

BACKGROUND OF THE INVENTION

The invention relates to a kitchen appliance for processing food by chopping, mixing, stirring, kneading, pressing etc. or for producing emulsions of food with a processing tool driven by a motor and having a respective working chamber.

A kitchen appliance of the aforementioned kind is known as a conventional food processor. Such food processors have commonly adapters for respective tools which are inserted for a working process into a working chamber of a separate vessel. As a universal tool for the commonly performed processing operations for food a two-blade knife is used that is rotated at high speeds.

The food processors of the aforementioned kind have a couple of disadvantages. For example, with the known food processors a uniform size reduction of food can only be achieved to a certain extent because the reduction tools are rotated stationarily about an axle and operate only in one cutting plane. Accordingly, the food to be cut which is directly adjacent to the knife is reduced in size to a much greater extent than the food to be cut which is conveyed to the cutting tool by mixing. The desired mixing in known food processors is based on friction and centrifugal forces which due to the fast rotating cutting tool are generated within the food to be cut. The tackiness and smearing especially of fat-containing foods or oily substances resulting from the frictional heat prevent a sufficient mixing and thus a uniform size reduction. A further disadvantage is that the known food processors can perform only one processing step whereby in addition the amount of food to be processed is relatively small. Furthermore, with conventional food processors an emulsion can be produced only to a limited extent, and also the cleaning of such food processors is cumbersome and time-consuming.

It is an object of the invention to provide a kitchen appliance which with a simple attachment of its different tools allows for different processing operations with varying processing requirements for the food.

SUMMARY OF THE INVENTION

The kitchen appliance for processing food by chopping, mixing, whipping, kneading, pressing, and preparing emulsions from food according to the present invention is primarily characterized by:

a container for receiving food and being in the form of a horizontally positioned cylindrical vessel;

a tool for processing food in the vessel and having a diameter that matches an inner diameter of the vessel;

a drive motor for driving the tool in rotation;

a drive shaft connecting the tool and the drive motor;

an advancing unit for advancing the tool in an axial direction of the vessel over an axial length of the vessel, the advancing unit comprising a stationary spindle and a slide connected to the spindle so as to be slidable on the spindle in the axial direction of the vessel, the advancing unit further comprising an electric motor for axially displacing the slide on the spindle; and wherein the drive motor of the tool is connected to the slide.

Advantageously, the vessel has a rear wall with a throughbore through which the drive shaft extends. The throughbore has a seal for sealing the drive shaft within the throughbore.

The tool is connected to a free end of a portion of the drive shaft extending into the interior of the vessel.

Preferably, a plurality of the tools that are arranged adjacent to one another on the portion of the drive shaft extending into the exterior of the vessel are provided.

The vessel has a forward wall in the form of a discharge funnel. The forward wall has an inner fitting for receiving a processing disk.

The processing disk may be a closure plate or a perforated disk. The processing disk may have at least one opening for shaping the food.

The forward wall may also have a discharge screw.

Preferably, the vessel has a cylindrical wall, with an upper portion of the cylindrical wall being a pivotable closure extending over the axial length of the vessel. The closure has a lock and a seal for tightly sealing the closure of the cylindrical wall.

Expediently, the cylindrical wall of the vessel has a cooling device connected thereto.

The tool may be a knife having a plurality of knife blades that are staggered in an axial direction of the drive shaft in different cutting planes.

In an another embodiment of the present invention, the tool is a paddle blade mixer with two oppositely arranged paddle blades.

The tool may also be an emulsion mixer comprising a central disk and a wire spiral connected to a periphery of the central disk.

The tool may also be a pressure disk having an annular seal connected to a periphery thereof.

In another embodiment, the tool is cutting tool in the form of a wire screen.

The tool may also be a cleaning tool having two oppositely arranged blades, wherein the blades have rubber lamellas on a front side and a backside thereof as well as on free ends thereof.

Expediently, the kitchen appliance further has a housing for enclosing the vessel, the drive motor, and the advancing unit.

The inventive kitchen appliance is based on the principle that the working chamber of the appliance is in the form of a tubular vessel which is horizontally arranged and that the tool during the processing operation is guided in rotation over the length of the vessel with an advancing unit along a drive shaft in the longitudinal direction of the vessel and corresponds with its diameter to the corresponding inner dimension of the vessel.

The present invention has the advantage that with a universal kitchen appliance different processing operations can be performed. In an advantageous manner it is also possible to perform a plurality of processing operations in sequence because a simple exchange of processing tools is possible despite the fact that the machine is filled when interrupting a processing operation. With a corresponding adaptation of the tool it is possible to take into consideration different requirements for processing food whereby especially the preparation of ingredients for producing bread and sausages as well as for producing the aforementioned foods is simplified. As a special advantage of the inventive kitchen appliance an easy cleaning operation is to be mentioned because a complete cleaning of the kitchen appliance is possible by filling a cleaning emulsion into the vessel and performing a processing step with the kitchen appliance with the used tools as well as a special cleaning tool. Due to this measure, even when processing different basic substances one after another, no complicated dismantling, cleaning, and reassembling of the kitchen appliance is required.

It is especially advantageous that with the kitchen appliance an individual processing operation is adjustable. It is possible to vary the degree of chopping, grinding, or mixing. For example, in the production of jam or ice cream, the size of the fruit pieces can be adjusted and for the manufacture of fruit juices the ratio of fruit particles within the juice can be determined by adjusting the size reduction of the fruit to a finer or courser setting. This is advantageously possible by the tool passing through the vessel in a rotating manner so that the substance within the vessel is exposed only to a predetermined processing effect of the tool because due to the advancement of the tool an extended exposure of the substance within the vessel in an already processed zone of the vessel is prevented.

According to an embodiment of the invention for the realization of the drive of the tool the rear wall of the vessel is provided with a throughbore for the drive shaft, the throughbore being sealed by a seal whereby the tool is fixedly connectable to the tip of the shaft. It is also possible to connect sequentially a plurality of tools to the shaft whereby especially in combination with a cleaning tool the working success of the kitchen appliance is improved in all aspects.

For effecting the desired advancement of the tool, the drive motor for the shaft that carries the tool is connected to a slide that is slidable in the longitudinal direction of the vessel along a spindle with a corresponding electric motor so that the shaft including drive motor is displaced in the longitudinal direction of the vessel and thus realizes the required advancement of the tool connected to the drive shaft.

In an expedient embodiment of the invention the forward wall of the vessel is in the form of a discharge funnel which is advantageous for certain applications of the kitchen appliance. The inner side of the forward wall is provided with a fitting for receiving processing disks, which, for example, are in the form of a closure disk, a perforated disk, or a disk with at least one opening for shaping the food in order to adapt the kitchen appliance to different requirements of processing steps. Expediently, the forward wall may be provided with a discharge screw in order to discharge cleaning liquid or other liquid residues within the vessel.

In order to ensure the accessibility of the vessel as a working chamber, according to one embodiment of the invention the cylindrical wall of the vessel is provided with a pivotable closure extending at its upper portion over its length. The closure is closable with a seal and a lock in a tight manner.

According to a special embodiment of the invention, especially in view of producing ice cream, the cylindrical wall of the vessel is provided with a cooling device.

Other embodiments of the invention are concerned especially with the design and construction of tools connectable to the drive shaft. For example, the tool may be in the form of a cutting knife with a plurality of cutting blades, wherein the cutting blades are staggered in the longitudinal direction of the vessel in different cutting planes.

The tool may also be in the form of a paddle blade mixer in which two paddle blades are oppositely arranged and have a paddle blade edge with an angle of, for example, approximately 20°.

The tool may also be in the form of an emulsion mixer with a central aluminum disk and an outer wire spiral surrounding it whereby the total diameter of the emulsion mixture corresponds to the inner dimension of the vessel.

The tool may preferably be an aluminum disk which functions as a pressure disk and has inserted into its periphery an annular seal.

The tool may also be a cheese grater which is comprised of an aluminum ring which has connected thereto a wire screen consisting of V2A wire having a distance between wires of at least 4 mm.

The tool may also be in the form of a cleaning device which has two oppositely arranged blades that at their free ends as well as on their front side and their backside have rubber lamellas.

BRIEF DESCRIPTION OF THE DRAWINGS

In the drawings embodiments of the invention are shown which will be described in the following. It is shown in.

DESCRIPTION OF PREFERRED EMBODIMENTS

Figure 1:
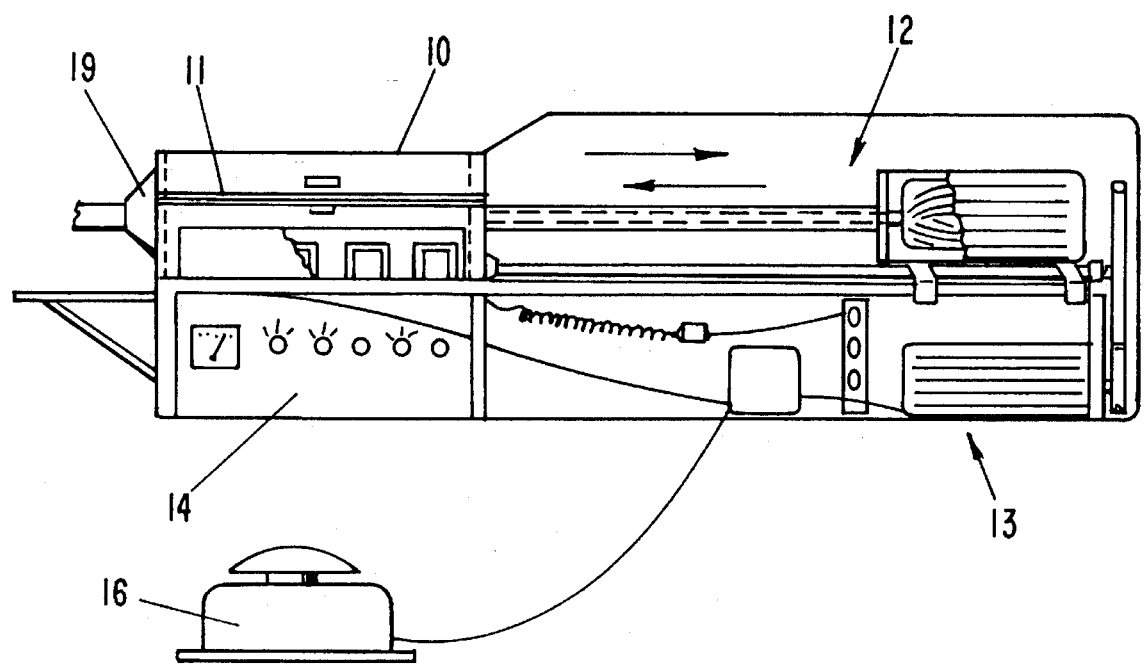
FIG. 1 a kitchen appliance in a side view.

In a common housing 10 a horizontally arranged cylindrical vessel 11 with a drive unit 12 for the tool movable within the vessel and with an advancing unit 13 is arranged. The housing 10 has an operator panel 14 with functional selection as well as monitoring units, furthermore electric connectors 15, wherein for supplementing the operation a foot switch 16 is provided.

Figure 2:
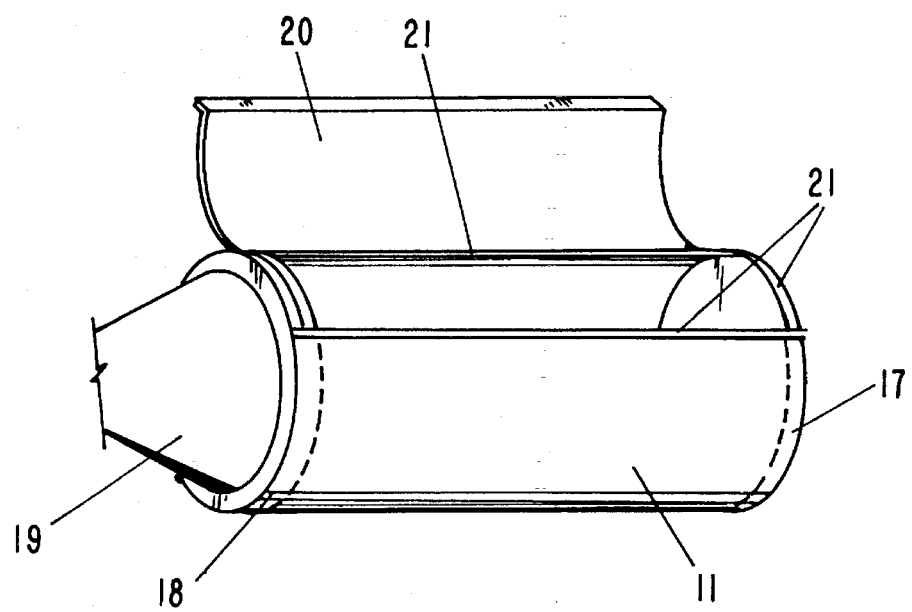
FIG. 2 a vessel of the kitchen appliance in an enlarged representation.

The vessel 11, which is shown in detail in FIG. 2, has a rear wall 17 and a forward wall 18 which has a transition into a discharge funnel 19. At the upper portion of the vessel 11 the cylindrical wall has a closure 20 which can be upwardly pivoted and provides for a good access to the interior of the vessel 11 that is to be used as the working chamber. A seal 21 extends about the periphery and provides for a sealing of the working chamber when the closure 20 is closed. With a lock 22 (FIG. 3) the vessel 11 is closable.

Figure 3:
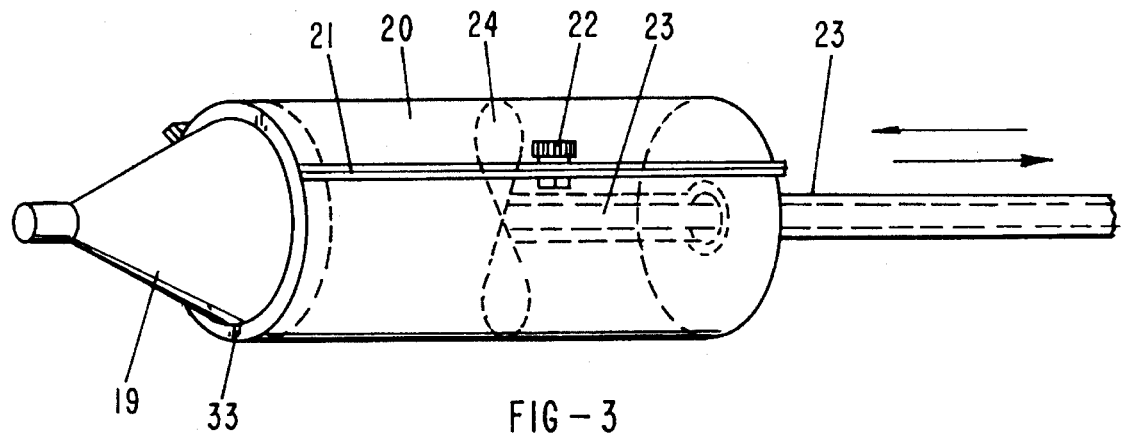
FIG. 3 the object of FIG. 4 with tool and drive.
Figure 4:
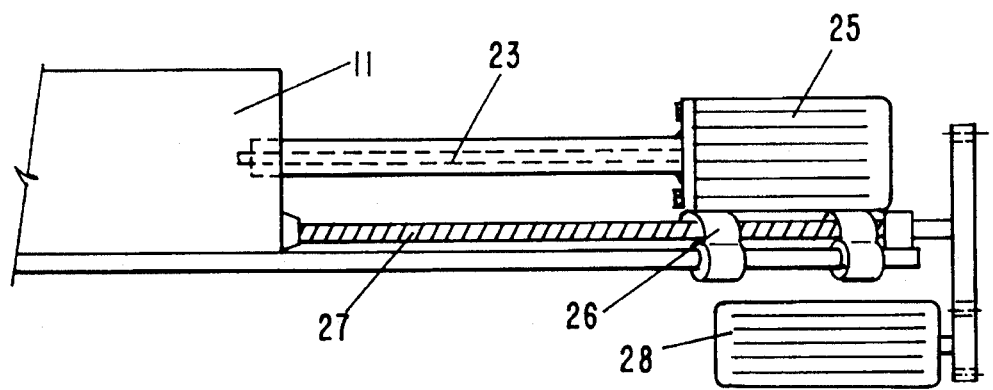
FIG. 4 the advancing unit of the tool.

The operation of the kitchen appliance will be explained in detail with the aid of FIGS. 3 and 4. Along the longitudinal axis of the vessel 11 a shaft 23 is arranged having at its forward end a tool 24 which is rotated with the shaft 23. The shaft 23 is connected with its rearward end extending from the vessel 11 to an electric motor 25 which is preferably continuously adjustable. For generating the required advancing movement of the tool 24 the drive motor 25 is connected to a slide 26 which is slidable along a stationary spindle connected with the vessel 11. The rotation of the spindle 27 is effected with an electric motor 28 positioned below the spindle. Slide 26 with spindle 27 and electric motor 28 form the advancing unit 13.

Figure 5:
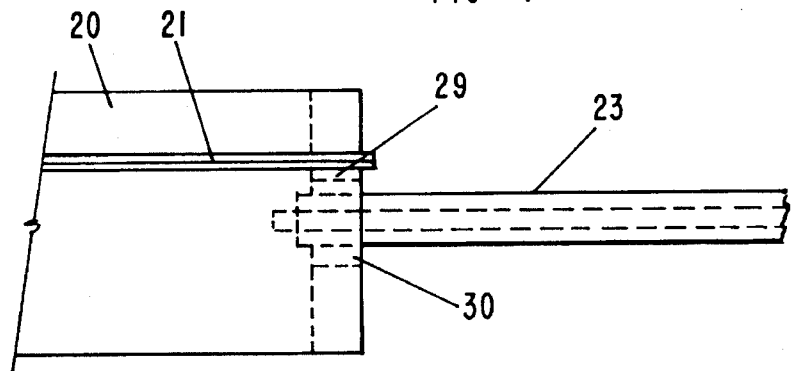
FIG. 5 the rear wall of the vessel in an enlarged representation.
Figure 6:
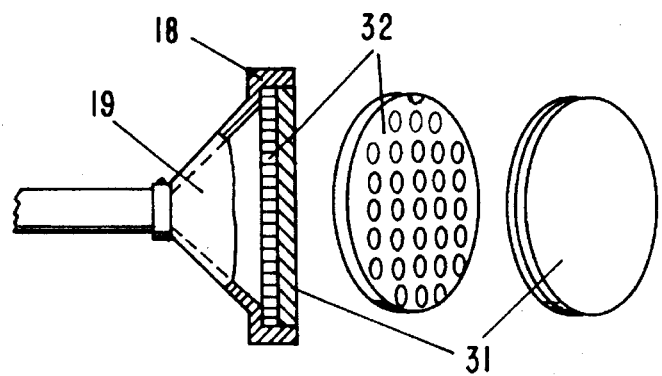
FIG. 6 the forward wall of the vessel in an enlarged representation.

From FIGS. 5 and 6 the details with respect to the design of the vessel can be taken. From FIG. 5 it can be taken that the rearward wall 17 has a throughbore 29 with a seal 30 for the shaft 23. As can be seen in FIG. 6, the forward wall 18 with the connected funnel 19 is provided at the inner side of the vessel 11 with a fitting for processing disks which, according to the shown embodiment, can be a closure plate 31, respectively, a perforated disk 32. At the forward wall 18 a discharge screw 33 is also arranged.

Figure 7:
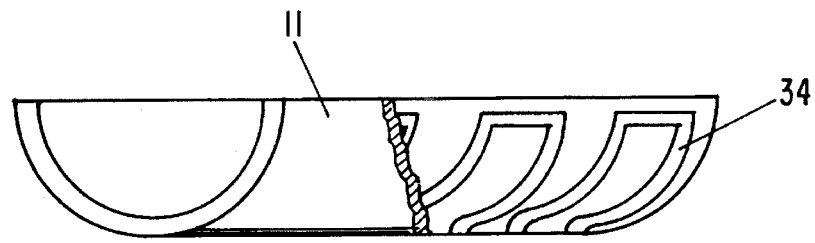
FIG. 7 a portion of the cylindrical wall of the vessel.
Figures 8A, 8B:
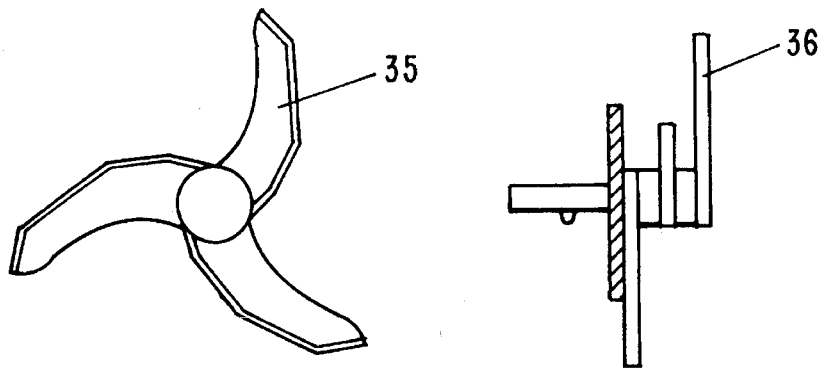
FIGS. 8a, 8b a tool in the form of a cutting knife.

From FIG. 7 an embodiment of the vessel 11 can be taken in which the stationary cylindrical wall of the vessel 11 is provided with cooling coils 34 which with a respective insulation of the cylindrical wall allow for the production of ice cream within the vessel 11. In FIGS. 8 to 11 tools are represented which are especially designed for the inventive kitchen appliance. FIGS. 8a and b show a cutting knife 35 with three knife blades 36 which are staggered in the longitudinal direction of the vessel 11, respectively, in the direction of the shaft 23 in different cutting planes. Together with the axial advancement of the knife through the vessel 11 this results in an especially favorable size reduction effect.

Figures 9, 10:
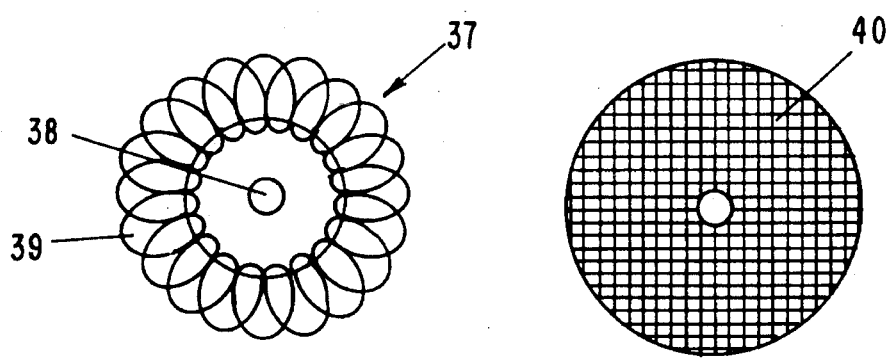
FIG. 9 a tool in the form of an emulsion mixer.
FIG. 10 a tool in the form of a cheese grater.

FIG. 9 shows an emulsion mixer which is comprised of a central disk 38 which is surrounded by a wire spiral 39. It is understood that the total diameter of the disk 38 with wire spiral 39 corresponds to the inner dimension of the vessel 11. With such a tool emulsions may be produced in a favorable manner because the central disk 38 exerts a pressure onto the supply of food within the vessel 11 whereby a fine size reduction and mixing occurs at the outer periphery with the wire spiral 39.

FIG. 10 shows the embodiment of a tool as a so-called cheese grater 40 which is comprised substantially of a wire screen and is movable without rotation by the advancing unit through the vessel 11.

Figure 11:
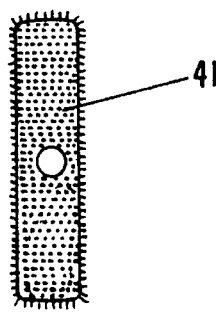
FIG. 11 a tool in the form of a cleaning device.

FIG. 11 shows an advantageous cleaning device 41 which is comprised of two oppositely arranged blades. The blades are provided at their ends as well as at their front side and backside with rubber lamellas.

Furthermore, other shapes of tools are usable such as, for example, a paddle blade mixer with two oppositely arranged paddle blades having blade edges that are positioned at an angle of, for example, 20°. It is also possible to use an aluminum disk functioning as a pressure disk having an O-ring seal inserted at its outer circumference whereby the entire diameter of the pressure disk corresponds to the inner dimension of the vessel 11. Such a tool is advanced without rotation only with the advancing unit 13 within the interior of the vessel 11 whereby the pressed substance is discharged especially via the discharge funnel 19.

Finally, a few especially advantageous applications for the inventive kitchen appliance are to be named:
1. Emulsifying sausage stuffing for cooked sausages or bratwurst, mayonnaise, ketchup, or emulsions of vegetable material, whereby protein cells or fat cells must be destroyed and whereby constant temperature and a high comminution ability is needed because the cells must be destroyed in order to provide a binding with water.
2. Chopping meat because a uniform dicing can be achieved without portions being squashed or producing mush.
3. Grinding because a size reduction is ensured without producing too high a meal component.
4. Mixing because a uniform mixing is ensured which is also possible for different consistencies of the materials to be mixed.
5. Stirring because different compositions can be uniformly mixed.
6. Kneading because even substances that are difficult to be mixed can be kneaded to a uniform mass.
7. Shaping because by advancing the tool without rotation the required pressure can be exerted in order to press the dough through the shaping opening provided especially in a disk that is inserted into the forward wall.
8. Pressing whereby the required pressure is adjustable via the advancing unit of the tool and the liquid pressed out of the substance is dischargeable via the discharge funnel.
9. Filling, since the discharge funnel provided at the forward wall allows for a filling of the product directly into suitable containers without a previous refilling step.
10. Cleaning because the kitchen appliance does not require disassembly and cleaning of individual components, but is ready for the next processing step after a cleaning operation.

The features of the inventive object of this application disclosed in the above description, the claims, the abstract, and the drawing, may be important individually as well as in any desired combination for the realization of the invention in its various embodiments.

The present invention is, of course, in no way restricted to the specific disclosure of the specification and drawings, but also encompasses any modifications within the scope of the appended claims.

What I claim is:

1. A kitchen appliance for processing food by chopping, mixing, whipping, kneading, pressing, and preparing emulsions from food, said appliance comprising:

a container for receiving food, said container being in the form of a cylindrical horizontally positioned vessel;

a tool for processing food in said vessel, said tool having a diameter that matches an inner diameter of said vessel;

a drive motor for driving said tool in rotation;

a drive shaft connecting said tool and said drive motor;

an advancing unit for advancing said tool in an axial direction of said vessel over an axial length of said vessel, said advancing unit comprising a stationary spindle and a slide connected to said spindle so as to be slidable on said spindle in said axial direction of said vessel, said advancing unit further comprising an electric motor for displacing said slide on said spindle in said axial direction;

wherein said drive motor of said tool is connected to said slide; and wherein said vessel has a forward wall in the form of a discharge funnel.

2. A kitchen appliance according to claim 1, wherein said vessel has a rear wall with a throughbore through which through bore said drive shaft extends, said throughbore having a seal for sealing said drive shaft within said throughbore, with said tool connected to a free end of a portion of said drive shaft extending into an interior of said vessel.

3. A kitchen appliance according to claim 2, further comprising a plurality of said tools, said tools arranged adjacent to one another on said portion of said drive shaft extending into said exterior of said vessel.

4. A kitchen appliance according to claim 1, wherein said forward wall has an inner fitting for receiving a processing disk.

5. A kitchen appliance according to claim 4, wherein said processing disk is a closure plate.

6. A kitchen appliance according to claim 4, wherein said processing disk is a perforated disk.

7. A kitchen appliance according to claim 4, wherein said processing disk has at least one opening for shaping the food.

8. A kitchen appliance according to claim 1, wherein said forward wall has a discharge screw.

9. A kitchen appliance according to claim 1, wherein said tool is selected from the group consisting of a knife having a plurality of blades, said blades being staggered in an axial direction of said drive shaft so as to provide different cutting planes; a paddle blade mixer with two oppositely arranged paddle blades; an emulsion mixer comprising a central disk and a wire spiral connected to a periphery of said central disk; a pressure disk having an annular seal connected to a periphery of said pressure disk; a cutting tool in the form of a wire screen; and a cleaning tool having two oppositely arranged blades, said blades having rubber lamellas on a front side and a backside thereof as well as on free ends thereof.

10. A kitchen appliance according to claim 1, further comprising a housing for enclosing said vessel, said drive motor, and said advancing unit.

11. A kitchen appliance according to claim 1, wherein said vessel has a cylindrical wall, with an upper portion of said cylindrical wall being a pivotable closure extending over said axial length of said vessel, said closure having a lock and a seal for tightly sealing said closure of said cylindrical wall.

12. A kitchen appliance according to claim 1, further comprising a cooling device connected to a cylindrical wall of said vessel.

13. A kitchen appliance for processing food by chopping, mixing, whipping, kneading, pressing, and preparing emulsions from food, said appliance comprising:

a container for receiving food, said container being in the form of a cylindrical horizontally positioned vessel;

a tool for processing food in said vessel, said tool having a diameter that matches an inner diameter of said vessel;

a drive motor for driving said tool in rotation;

a drive shaft connecting said tool and said drive motor;

an advancing unit for advancing said tool in an axial direction of said vessel over an axial length of said vessel, said advancing unit comprising a stationary spindle and a slide connected to said spindle so as to be slidable on said spindle in said axial direction of said vessel, said advancing unit further comprising an electric motor for displacing said slide on said spindle in said axial direction;

wherein said drive motor of said tool is connected to said slide; and wherein said vessel has a cylindrical wall, with an upper portion of said cylindrical wall being a pivotable closure extending over said axial length of said vessel, said closure having a lock and a seal for tightly sealing said closure of said cylindrical wall.

14. A kitchen appliance according to claim 13, wherein said vessel has a rear wall with a throughbore through which through bore said drive shaft extends, said throughbore having a seal for sealing said drive shaft within said throughbore, with said tool connected to a free end of a portion of said drive shaft extending into an interior of said vessel.

15. A kitchen appliance according to claim 14, further comprising a plurality of said tools, said tools arranged adjacent to one another on said portion of said drive shaft extending into said exterior of said vessel.

16. A kitchen appliance according to claim 13, further comprising a cooling device connected to a cylindrical wall of said vessel.

17. A kitchen appliance according to claim 13, wherein said tool is selected from the groups consisting of: a knife having a plurality of blades, said blades being staggered in an axial direction of said drive shaft so as to provide different cutting planes; a paddle blade mixer with two oppositely arranged paddle blades; an emulsion mixer comprising a central disk and a wire spiral connected to a periphery of said central disk; a pressure disk having an annular seal connected to a periphery of said pressure disk; a cutting tool in the form of a wire screen; and a cleaning tool having two oppositely arranged blades, said blades having rubber lamellas on a front side and a backside thereof as well as on free ends thereof.

18. A kitchen appliance according to claim 13, further comprising a housing for enclosing said vessel, said drive motor, and said advancing unit.

19. A kitchen appliance for processing food by chopping, mixing, whipping, kneading, pressing, and preparing emulsions from food, said appliance comprising:

a container for receiving food, said container being in the form of a cylindrical horizontally positioned vessel;

a tool for processing food in said vessel, said tool having a diameter that matches an inner diameter of said vessel;

a drive motor for driving said tool in rotation;

a drive shaft connecting said tool and said drive motor;

an advancing unit for advancing said tool in an axial direction of said vessel over an axial length of said vessel, said advancing unit comprising a stationary spindle and a slide connected to said spindle so as to be slidable on said spindle in said axial direction of said vessel, said advancing unit further comprising an electric motor for displacing said slide on said spindle in said axial direction;

wherein said drive motor of said tool is connected to said slide; and further comprising a cooling device connected to a cylindrical wall of said vessel.

20. A kitchen appliance according to claim 19, wherein said vessel has a rear wall with a throughbore through which through bore said drive shaft extends, said throughbore having a seal for sealing said drive shaft within said throughbore, with said tool connected to a free end of a portion of said drive shaft extending into an interior of said vessel.

21. A kitchen appliance according to claim 20, further comprising a plurality of said tools, said tools arranged adjacent to one another on said portion of said drive shaft extending into said exterior of said vessel.

22. A kitchen appliance according to claim 19, wherein said tool is selected from the groups consisting of: a knife having a plurality of blades, said blades being staggered in an axial direction of said drive shaft so as to provide different cutting planes; a paddle blade mixer with two oppositely arranged paddle blades; an emulsion mixer comprising a central disk and a wire spiral connected to a periphery of said central disk; a pressure disk having an annular seal connected to a periphery of said pressure disk; a cutting tool in the form of a wire screen; and a cleaning tool having two oppositely arranged blades, said blades having rubber lamellas on a front side and a backside thereof as well as on free ends thereof.

23. A kitchen appliance according to claim 19, further comprising a housing for enclosing said vessel, said drive motor, and said advancing unit.

* * * * *